(12) United States Patent
Gabbai

(10) Patent No.: US 11,747,705 B2
(45) Date of Patent: Sep. 5, 2023

(54) HIGH FREQUENCY OPTICAL SWITCH AND FABRICATION METHODS THEREOF

(71) Applicant: TERAHERTZ GROUP LTD., Herzliya (IL)

(72) Inventor: Eran Gabbai, Herzliya (IL)

(73) Assignee: TERAHERTZ GROUP LTD., Herzliya (IL)

( * ) Notice: Subject to any disclaimer, the term of this patent is extended or adjusted under 35 U.S.C. 154(b) by 0 days.

(21) Appl. No.: 17/470,590

(22) Filed: Sep. 9, 2021

(65) Prior Publication Data

US 2022/0171252 A1    Jun. 2, 2022

Related U.S. Application Data

(63) Continuation of application No. 16/633,500, filed as application No. PCT/IL2018/050822 on Jul. 24, 2018, now Pat. No. 11,181,800.

(Continued)

(51) Int. Cl.
*G02F 1/225* (2006.01)
*H04B 10/90* (2013.01)

(52) U.S. Cl.
CPC ........... *G02F 1/2255* (2013.01); *H04B 10/90* (2013.01); *G02F 2202/30* (2013.01)

(58) Field of Classification Search
CPC .................................................. G02F 1/2255
See application file for complete search history.

(56) References Cited

U.S. PATENT DOCUMENTS 6,310,725 B1   10/2001 Duine et al.
8,111,722 B1    2/2012 Maleki et al.
(Continued)

FOREIGN PATENT DOCUMENTS

CN    102967961 A    3/2013
CN    103454784 A    12/2013
(Continued)

OTHER PUBLICATIONS

Bahadoran et al., "Ultrafast all-optical switching using signal flow graph for PANDA resonator", Applied Optics, Apr. 20, 2013, pp. 2866-2873, vol. 52, No. 12, Optical Society of America.

(Continued)

*Primary Examiner* — Sung H Pak
(74) *Attorney, Agent, or Firm* — TAROLLI, SUNDHEIM, COVELL & TUMMINO L.L.P.

(57) ABSTRACT

Optical switch and modulator devices are described, usable for Terahertz data communication rates. The device comprising an optically transmissive substrate configured for propagating electromagnetic radiation therethrough and a metamaterial arrangement optically coupled to said substrate. The metamaterial arrangement comprises at least one layer of metamaterial particles optically coupled to at least some portion of said optically transmissive substrate, and at least one nanomesh layer made of at least one electrically conducting material placed over at least some portion of the at least one metamaterial layer. The at least one nanomesh layer configured to discharge electrons into the at least one metamaterial layer responsive to electromagnetic or electric signals applied to the metamaterial arrangement, and the at least one metamaterial layer configured to change from an optically opaque state into an optically transparent state upon receiving the discharged electrons, to thereby at least partially alter electromagnetic radiation passing through the substrate.

14 Claims, 5 Drawing Sheets

Related U.S. Application Data

(60) Provisional application No. 62/535,980, filed on Jul. 24, 2017.

(56) References Cited

U.S. PATENT DOCUMENTS

| | | |
|---|---|---|
| 8,159,736 B2 | 4/2012 | Maleki et al. |
| 8,655,189 B2 | 2/2014 | Almassy et al. |
| 9,442,313 B2 | 9/2016 | Choi et al. |
| 9,964,442 B2 | 5/2018 | Roulston et al. |
| 2005/0046523 A1 | 3/2005 | Wu et al. |
| 2010/0309539 A1 | 12/2010 | Kaye et al. |
| 2011/0075239 A1 | 3/2011 | Moiseev et al. |
| 2011/0311234 A1 | 12/2011 | Almassy et al. |
| 2014/0001379 A1 | 1/2014 | Kee et al. |
| 2014/0211298 A1 | 7/2014 | Sayyah et al. |
| 2016/0033849 A1 | 2/2016 | Mazed et al. |
| 2017/0108756 A1 | 4/2017 | Huang et al. |

FOREIGN PATENT DOCUMENTS

| | | |
|---|---|---|
| CN | 105093777 A | 11/2015 |
| CN | 105204190 A | 12/2015 |
| CN | 106646930 A | 5/2017 |
| EP | 2 876 824 | 5/2015 |
| JP | 04-371913 A | 12/1992 |
| JP | 2000-298215 | 10/2000 |
| WO | WO-02/08815 A1 | 1/2002 |
| WO | WO-02/16986 A1 | 2/2002 |
| WO | WO-2007/132459 A2 | 11/2007 |
| WO | WO-2008/121159 A2 | 10/2008 |
| WO | 2009009770 A1 | 1/2009 |

OTHER PUBLICATIONS

International Search Report & Written Opinion of the International Searching Authority issued in International Application No. PCT/IL2018/050822 dated Oct. 29, 2018.

M. Hada et al., "Ultrafast Hot Electron Induced Phase Transitions in Vanadium Dioxide", EPJ Web of Conferences, 2013, 3 pages, vol. 41, published by EDP Sciences, 2013.

Righini et al., "Whispering gallery mode microresonators: Fundamentals and applications", Rivista Del Nuovo Cimento, 2011, pp. 435-488, vol. 34, No. 7, Societa Italiana di Fisica.

Zheng et al., "Breakthroughs in Photonics 2014: Phase Change Materials for Photonics", IEEE Photonics Journal, Jun. 2015, pp. 1-5, vol. 7, No. 3.

Appavoo et al., Ultrafast phase transition via catastrophic phonon collapse driven by plasmonic hot-electron injection, Nano Letters, American Chemical Society, Jan. 2014, vol. 14, No. 3 pp. 1127-1133.

Sanchez et al., Analysis and Design Optimization of a Hybrid $VO_2$/Silicon 2 x 2 Microring Switch, IEEE Photonics Journal, vol. 8, No. 2, Apr. 2016, pp. 7802709-1 to 7892709-9.

Zimmers et al., Role of Thermal Heating on the Voltage Induced Insulator-Metal Transition in $VO_2$, Physical Review Letters, Feb. 1, 2013, vol. 110, pp. 0566011-1-056601-5.

HIGH FREQUENCY OPTICAL SWITCH AND FABRICATION METHODS THEREOF

CROSS-REFERENCE TO RELATED APPLICATIONS

The present application is a continuation of U.S. patent application Ser. No. 16/633,500, filed Jul. 24, 2018, now U.S. Pat. No. 11,181,800, which is a national phase of International Application No. PCT/IL2018/050822, filed on Jul. 24, 2018, which claims the benefit of and priority to U.S. Provisional Application No. 62/535,980, filed on Jul. 24, 2017. The entire contents of these applications are incorporated by reference herein.

TECHNOLOGICAL FIELD

The present invention is generally in the field of optical switches usable for high frequency optical wave modulation.

BACKGROUND

There is in an ongoing increasing demand for bandwidth in data communication services, required to satisfy the rapidly increasing needs mainly attributed to wide spread use of smartphones, social media, video streaming, and big data. The 10 Gb/s technology widely used nowadays in data centers reached maturity, and bigger data communication pipes are now required to cope with the huge quantities of data streamed over communication networks. Indeed, service providers (SPs) are moving to higher bit rates equipment, to increase bandwidths towards the 40 Gb/s and 100 Gb/s ranges per wavelength.

The International Telecommunication Union (ITU) divides the relevant electromagnetic microwave spectrum range of 1530-1565 nm (in which optical fibers show lowest loss, also known as the C-band) into fixed 50 GHz spectrum slots. However, this channel spacing scheme is probably not adequate for bit rates greater than 100 Gb/s. There is thus a need in the art for a more flexible grid paradigm capable of satisfying the needs of future bandwidth demands.

In fact, high-data-rate signals become increasingly difficult to transmit over long distances at high spectral efficiency, even if sufficiently broad spectrum is available. It is therefore beneficial for transceivers to adapt to the actual conditions of the network and data rate for each given traffic demand, in order to maximize spectral efficiency. Above the need to enhance the spectral efficiency, large content providers, newly constructed data centers, and evolving peering relationships between providers, are propelling the uncertainty and heterogeneity of the demands across the network. There is thus a need for flexible and adaptive networks, equipped with flexible transceivers and network elements, that can adapt to the actual ongoing increasing data communication traffic demands.

It is recognized that fast-switching and modulation are the main barriers for increased bandwidths communication in bit rates greater than 100 Gb/s, and in Terahertz. The barriers and limitations for ultra-fast communication can be attributed to RF, optical, switching, and Terahertz Limitations, associated with the network infrastructures being used nowadays, as explained hereinbelow:

The RF limitations (microwave spectrum) are mainly due to the difficulty to fabricate electronic devices configured to operate in frequency ranges substantially above a few hundred gigahertz. This difficulty is partly due to the inherent need for very short carrier transit times in semiconductors active regions, and also a consequence of the low powers produced by devices, which must have small active areas to minimize their capacitance.

Optical limitations are encountered since interband diode lasers are mainly designed for operation at visible and near-IR frequencies. It however appears that the generation of light signals by radiative recombination of conduction band electrons with valence band holes across bandgaps of active semiconductor materials cannot be simply extended into the mid-IR or to longer wavelength ranges, since suitable narrow bandgap semiconductors are not available.

Switching limitations are also encountered since controlling light transmission through a material, with electric fields for example, is not suitable for long wavelengths e.g., near, or in the Terahertz region, of the light spectrum because the switching contrast between ON/OFF states that can be achieved by solid-state electronic equipment is too weak and slow.

The Terahertz limitation is attributed to the lack of energetic Terahertz frequency sources with good resolution.

Some solutions suggested in the patent literature are briefly described hereinbelow.

European patent publication No. 2,876,824 describes a transmission arrangement for transmitting data with at least one carrier wave in the terahertz region. The transmission arrangement comprises a transmitter device, receiving means, and an optical transmission system for transmission of light beams. The transmitting device and the receiving means are adapted to wirelessly transfer data by a wave carrier modulated in the terahertz range of the transmitter. The carrier wave is generated using difference frequency mixing of two light beams produced by one or two light sources.

The techniques and devices described in U.S. Pat. No. 8,111,722 are based on optical resonators made of nonlinear optical materials and nonlinear wave mixing to generate RF or microwave oscillations and optical comb signals.

U.S. Pat. No. 8,159,736 describes photonic devices and techniques based on tunable single sideband (SSB) modulation in whispering gallery mode resonators formed of electro-optic materials to effectuate coupling between whispering gallery modes of different polarizations.

The optical modulation system described in U.S. Pat. No. 8,655,189 includes a metamaterial structure configured to receive and process an input optical signal at at least one operational wavelength, where the metamaterial structure changes between a transmissive state and a non-transmissive state with respect to the optical signal(s) at the operational wavelength(s) in response to an external stimulus applied to the metamaterial structure. An external stimulus source is coupled with the metamaterial structure and is configured to change the metamaterial structure between its transmissive and non-transmissive states by applying selected stimulus pulses to the metamaterial structure. The optical modulation system processes the input optical signal to output a modulated optical signal that modulates in correspondence with the selected pulses applied to the metamaterial structure The above description introduce various aspects of art that may be related to various aspects of the present disclosure and intended to facilitate a better understanding of the various aspects thereof. It is noted that reference to any prior art mentioned in this application is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

GENERAL DESCRIPTION

The subject matter disclosed herein aims to provide techniques and implementations for optical modulation of long wavelengths near and/or in the Terahertz region of the light spectrum for achieving very high bit rates (at, and above, 100 Gb/s, 400 Gb/s, and in the Terahertz bit rate regions). The embodiments disclosed herein are suitable for implementations of optical modulators in solid state/chip devices configured to operate at room temperature. These embodiments can provide the flexibility and data communication rates needed for scalable adaptive networks, and thus attractive for use in new data centers constructed nowadays e.g., utilizing the flattened (east-west) topologies.

Adaptive data centers can be constructed from block-like network infrastructure units employing virtual blocks that can be seamlessly reconfigured. Moving to physical network using blocks that can be as easily scaled means the network can flex without having to reconfigure the entire backplane. The combination of adaptive transceivers, a flexible grid, and intelligent client nodes enables a new "adaptive" networking paradigm, allowing SPs to address the increasing needs of the network without frequently overhauling it.

The 100-Gb/s-based transmission systems have been commercialized in recent years, and since they are compatible with the 50 GHz ITU grid/channel spacing already deployed, the need for replacing the grid did not arise. Both the telecom and datacom industries are now considering a standard transmission data rate beyond 100 Gb/s, and 400 Gb/s is receiving a lot of attention. Unfortunately, the spectral width occupied by 400 Gb/s at standard modulation formats is too broad to fit in the 50 GHz ITU grid, and forcing it to fit by adopting a higher spectral efficiency modulation format would only allow short transmission distances. The fixed grid does not support bit rates of 400 Gb/s and 1 Tb/s at standard modulation formats, as they overlap with at least one 50 GHz grid boundary. It is thus understood that embodiments disclosed herein are beneficial for data centers implementations designed to satisfy the ongoing increase in bandwidth demands.

The embodiments disclosed herein utilizes active metamaterial coupled to wave conductors to construct high-quality optical switches, modulators, and/or filters, configured to operate in terahertz data transmission rates. In some embodiments metamaterials are used to implement an efficient thin-film terahertz switch that may allow terahertz communication and signal processing applications. Such a device is desperately needed for filtering, switching and modulating terahertz signals. The switching of terahertz radiation using thin-film devices has been hampered so far because of the wavelengths of terahertz-frequency electromagnetic waves are greater than the 300 micrometer range, and thus do not interact appreciably with structures much smaller than this wavelength. The use of metamaterials can circumvent this problem.

The terms wave conductor, optical wave conductor or wave line, are used herein to refer to mediums and/or elements usable for transmission of electromagnetic radiation, such as but not limited to, optical waveguides, optical fibers, air, as used in optical data communication. Metamaterials are artificially structured materials fabricated by assembling different, often nanoscale objects to take the place of the atoms and molecules that one would see in a conventional material, engineered to exhibit properties that are not naturally exhibited by their base materials. The metamaterials used in the embodiments disclosed herein have electromagnetic properties that are typically very different from those found in naturally occurring, or chemically synthesized, substances. The metamaterials used in some of the embodiments are designed to controllably exhibit negative refraction.

The metamaterials used in some of the embodiments disclosed herein are designed to have optical microstructures configured to interact with electromagnetic radiation (light) passing through them. For example, and without being limited, such optical microstructures can be constructed using metal oxide-based materials such as $VO_2$, $V_2O_3$, $WO_3$, $Ti_2O_3$, $NiS_2-ySe_y$, $LaCoO_3$, $PrNiO_3$, $Cd_2Os_2O_7$, $NdNiO_3$, $Tl_2Ru_2O_7$, $NiS$, $BaCo_{1-y}Ni_yS_2$ (where $y\leq1$), $Ca_{1-y}Sr_yVO_3$ (where $y\leq1$), $La_{2-2}Sr_{1+2}Mn_2O_7$ (where $y\leq1$), $Ti_4O_7$, $La_2NiO_4$, mixed oxides of the manganite type $RE_xAE_{1-x}MnO_3$ (where RE is a rare-earth metal such as lanthanum or praseodymium, AE is an alkaline-earth metal such as calcium, and $x\leq1$), intermetallics (such as NiAl), polymers such as azobenzene-containing polydiacetylenes, polyvinylidene fluoride, polyvinyl acetate, polyvinyl phenylene, polystyrene sulfonate, polyanilines (e.g., polyanilines doped into synthetic opal nanostructures), and nanostructured polymers such as diblock (e.g., poly[styrene-b-isoprene] or PS-b-PI) and triblock (e.g., a rod-coil copolymer poly[poly(N-isopropylacrylamide)-b-polyfluorene-b-poly(N-isopropylacrylamide)]) copolymers.

Such metamaterials can be used to construct ultra-small and ultra-fast optical switch devices made from vanadium oxide ($VO_2$). The ability of such devices to switch at terahertz frequency ranges is much faster than similar switch devices configured to operate at gigahertz frequencies. The use of $VO_2$ metamaterials to construct optical switch devices appears to be particularly attractive because it can be switched at terahertz rates between transmissive (insulator) and non-transmissive (conductor) states by inducing electrical charge/field, which can be exploited for constructing transistor-like devices.

The metamaterial used in some embodiments was made from nanoparticles of $VO_2$ that were deposited on an optically transparent substrate (glass), and coated by a "nanomesh" of tiny gold nanoparticles. When this layered structure is irradiated by electromagnetic pulses from an ultrafast THz source (e.g., any type of THz signal generator, such as, but not limited to, laser sources, any type of THz emitting crystal based device, or frequency multiplier), hot electrons discharged from the gold nanomesh into the $VO_2$ nanoparticles layer changes its phase from an optically opaque (metallic) phase into an optically transparent (semi-conducting) phase in time periods within the picosecond (PS, $10^{-12}$ seconds) time domain. Embodiments disclosed herein exploit this property of such metamaterials to controllably change between optically opaque and optically transparent states within PS time frames, to implement optical switch devices for communication applications.

One inventive aspect of the subject matter disclosed herein relates to an optical switch device usable for Terahertz data communication rates. The device comprises in some embodiments an optically transmissive substrate configured for propagating electromagnetic radiation therethrough and a metamaterial arrangement optically coupled to the substrate. The metamaterial arrangement comprises at least one layer of metamaterial particles optically coupled to at least some portion of the optically transmissive substrate, and at least one nanomesh layer made of at least one electrically conducting material placed over at least some portion of the at least one metamaterial layer. The at least one nanomesh layer configured to discharge electrons into the at least one metamaterial layer responsive to electromagnetic or electric signals applied to the metamaterial arrangement, and the at least one metamaterial layer configured to change from an optically opaque state into an optically transparent state upon receiving the discharged electrons, to thereby at least partially alter electromagnetic radiation passing through the substrate.

Optionally the optically transmissive substrate is in at least some portion of an optical fiber. Alternatively, the optically transmissive substrate is at least some portion of an optical WMG resonator e.g., PANDA resonator. In yet another alternative, the optically transmissive substrate is a thin film.

In some embodiments the substrate has a thickness of about 0.1 to 1 nanometers. Optionally, but in some embodiments preferably, the at least one metamaterial layer comprises Vanadium oxide. The at least one metamaterial layer can be configured to exhibit negative refraction upon receiving the discharged electrons.

The device comprises in some possible embodiments metal gratings formed on the metamaterial arrangement.

A thickness of the at least one layer of metamaterial particles can generally be about 0.1-1 nanometer. In some embodiments a particle size of the at least one layer of metamaterial particles is about 1 to 100 nanometers.

Optionally, but in some embodiments preferably, the at least one nanomesh layer comprises gold. A thickness of the at least one nanomesh layer can generally be about 0.1 to 1 nanometers. In some embodiments particle sizes of the at least one nanomesh layer is about 20 to 100 nanometers. A pore dimension/diameter of the at least one nanomesh layer is in some embodiments about 0.1 to 1 nanometers. The optical switch device may have a geometrical dimension of about 100 to 500 nanometers. In some embodiment the electromagnetic or electric signals applied to the metamaterial arrangement are in the RF, microwave, or Terahertz frequency bands (e.g., in a range of 100 MHz to 40 THz).

In another inventive aspect the subject matter disclosed herein is directed to an optical modulator usable for Terahertz data communication rates. The modulator may comprise the optical switch device described hereinabove or hereinbelow, an input wave line configured to introduce input electromagnetic radiation into the optical switch device, and an output wave line configured to transfer output electromagnetic radiation at least partially altered by the optical switch device.

Another optical modulator assembly usable for Terahertz data communication rates, can be implement using an input wave line configured to introduce input electromagnetic radiation into the optical modulator assembly, an optical splitter configured to receive the input electromagnetic radiation from the input wave line, first and second wave lines optically coupled to the optical splitter for receiving portions of the electromagnetic radiation from the input wave line thereby splitted, at least one optical switch device as described hereinabove or hereinbelow optically coupled to a respective core of at least one of the first and second wave lines, and an optical combiner optically coupled to the first and second wave lines for combining electromagnetic radiation received in them from the optical splitter and at least partially altered by the at least one optical switch device. The optical modulator may comprise an output wave line configured to receive the electromagnetic radiation combined by the optical combiner.

The optical modulator can comprise first and second optical switch devices respectively coupled to cores of the first and second wave lines. Optionally, but in some embodiments preferably, the at least one metamaterial layer comprises Vanadium oxide. Optionally, the at least one metamaterial layer is configured to exhibit negative refraction upon receiving the discharged electrons.

The modulator comprises in some embodiments metal gratings formed on the metamaterial arrangement.

Yet another inventive aspect of the subject matter of this application relates to an optical combiner device for combining two or more electromagnetic data carriers. The combiner device comprises at least one modulating WGM resonator having a metamaterial assembly coat over an internal wall section thereof, at least two input wave lines optically coupled to the at least one modulating WGM resonator for introducing respective at least two electromagnetic data carriers thereinto, and at least one output wave line optically coupled to the at least one WGM resonator for outputting electromagnetic radiation trapped inside the at least one modulating WGM resonator and at least partially merging the at least two electromagnetic data carriers.

The metamaterial assembly comprises in some embodiments Vanadium oxide e.g., nanoparticle layer as described herein. The metamaterial assembly can comprise gold e.g., a gold nanomesh layer applied over the Vanadium oxide layer, as described herein.

The optical combiner comprises in some embodiments at least one auxiliary WGM resonator having the metamaterial assembly coat over an internal wall and optically coupled to said at least one WGM resonator. The at least one auxiliary WGM resonator can be configured to shape the electromagnetic radiation trapped inside the at least one WGM resonator in a predefined manner.

The optical combiner can comprise gratings formed on the metamaterial assembly of the at least one WGM resonator. Optionally, at least one of the WGM resonators is an ellipsoid-shaped resonator.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A to 1C schematically illustrate operation of optical switches according to some possible embodiments, wherein FIG. 1A shows an optical switch prepared by deposition of metamaterial on a thin film, FIG. 1B shows a possible implementation of an optical switch and FIG. 1C shows time plots of input and output wave forms interaction with the optical switch;

FIGS. 4A and 4B schematically illustrate optical wave modulators utilizing whispering gallery mode (WGM) resonators, wherein FIG. 4A shows a possible implementation of the optical wave modulator utilizing a ring shaped resonator, and FIG. 4B shows a possible implementation of the optical wave modulator utilizing a multiple optically coupled WGM resonators and demonstrates the proximity needed to facilitate crosstalk/signal combining for WGM modulation.

DETAILED DESCRIPTION OF EMBODIMENTS

Figure 1A:
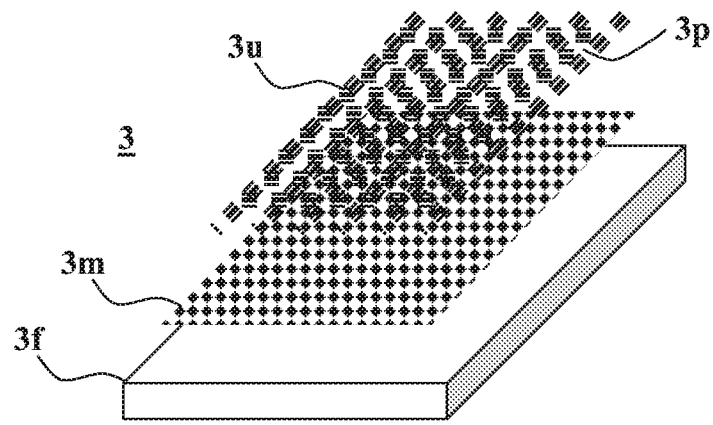

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the optical switches/modulators disclosed herein, once they understand their structures and principle of operation. This invention may be provided in other specific forms and embodiments without departing from the essential characteristics described herein.

This document describes optical switch and modulator devices configured to operate in high frequency ranges, near, and in, the Terahertz frequency region. The optical switch and modulator devices disclosed herein utilize metamaterial(s) configured to controllably change their optical properties and thereby alter passage of electromagnetic radiation passing through a wave conducting medium (e.g., fiber optic core) optically coupled to them. This is achieved in some embodiments by depositing the metamaterial on a portion of a wave conducting medium, such as an optical fiber, so as to optically couple between the metamaterial and the wave conducting medium (core) and allow the metamaterial to interact with electromagnetic radiation passing through it. For example, and without being limiting, when used in an optical fiber, the metamaterial may be applied over some predefined length that is with agreement with few wavelength ($\lambda$) (e.g. at least $4\lambda$) along the optical fiber, covering a defined angular/arc-section thereof covering its entire circumference (360°).

In some embodiments the optical switch and/or modulator devices are combined in whispering gallery mode (WGM) optical resonator assemblies, for modulating light introduced into the optical resonator by electric/optical signals applied to the metamaterial. This can be achieved by depositing the metamaterial on a portion of the WGM resonator so as to optically couple between the metamaterial and the wave conducting medium/core of the resonator, and allow the metamaterial to interact with electromagnetic radiation trapped inside the resonator. For example, and without being limiting, if the WGM resonator is a type of circular/elliptical ring/torus-shaped resonator, the metamaterial may be applied over some predefined length of at least 4 wavelengths along the WGM resonator, covering a defined angular/arc-section thereof covering its entire circumference (360°). It is however noted that WGM resonators of different shapes can be similarly used in embodiments of the this application, for example, 3D sphere shaped, 3D ellipsoid shaped, or 3D toroidal structures having polygon cross-sectional shapes (as graphically obtained by revolving a polygon about a toroid' symmetry axis).

Optionally, but in some embodiments preferably, the metamaterial is made from nanoparticles of Vanadium based materials, such as but not limited to Vanadium Oxide (VO2) nanoparticles. It is however noted that other possible metamaterials can be similarly used to implement the optical wave switch and/or modulator devices disclosed herein, without departing from the scope and spirit of the present application.

The optical wave switches/modulators disclosed herein can be configured to interface between nano- and macro-networks (THz$\zeta$→GHz), and for detection of biochemical assays, biomedical assays, chemical and molecular biology assays.

For an overview of several example features, process stages, and principles of the invention, the examples of light modulation structures illustrated schematically and diagrammatically in the figures are made of Vanadium based materials intended for use with coherent light, such as produced by semiconductor laser devices. Metamaterial based structures are shown as one example implementation that demonstrates a number of features, processes, and principles used to implement optical switches/modulators, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings provided herein. All such variations, as well as any other modifications apparent to one of ordinary skill in the art and useful in data communication applications may be suitably employed, and are intended to fall within the scope of this disclosure.

The research of optical phase change of Vanadium based metamaterials nanoparticles, such as VO2, coated by gold nanoparticles, by application of THz source is unclear as to whether this optical phase change can be obtained by application of electrons e.g., using a controllably varying electric filed. In the Terahertz communication domain devices should be sensitive for electrons and photons with low as possible energy and time consumption for activation and recovery. The inventor hereof found out that the optical phase change of VO2 works well with electrons (i.e., can be operated by application of electric filed), and that the injection of hot electrons from the gold nanoparticles also triggers the transformation with one fifth to one tenth as much energy input required by applying laser light directly on the bare VO2 nanoparticles (the use of the gold nanoparticles is 90% more efficient than applying direct laser light on the VO2 nanoparticles). It is thus concluded that the optical switch devices disclosed herein can be switched ON and OFF by application of both light and/or electrons/electric field sources operating in, RF, microwave, and Terahertz data transmission rates.

FIG. 1A schematically illustrates an optical switch device 3 formed of a substrate 3f, implemented in some embodiments by a thin film. The switch device 3 in this non-limiting example is made of a layer of nanoparticles 3m, having a thickness of about 0.1-1 nanometer, optically coupled to at least some portion the substrate 3f (e.g., by evaporation), an a nanomesh of gold and/or alike (electrically conducting) nanoparticles 3u, having a thickness of about 0.1 to 1 nanometers, applied (e.g., by evaporation over at least some portion of the metamaterial layer 3m.

Particle sizes of the nanoparticles of the metamaterial 3m can generally be in a range of about 1 to 20 nanometers, optionally about 1 to 100 nanometers. Particle sizes of the gold nanomesh 3u can generally be about 20 to 100 nanometers, and a dimension (size) of its pores 3p can generally be about 0.1 to 1 nanometers. The substrate 3f can be made from an optically transparent material, and in some embodiments it is implemented by a thin film made of material(s) that provide transparency by sintering (e.g., ceramic), and having a thickness of about 0.1 to 1 nanometers.

In some embodiments the metamaterial layer 3m is made of VO2 nanoparticles, which may have different various shapes. A geometrical dimension of the optical switch 3 in some possible embodiments is around few hundreds of nanometers in diameter, optionally about 100 to 500 nanometers, which is significantly smaller than geometrical dimensions of optical switches available heretofore. This smaller size optical switch for Terahertz rates switching speeds (e.g., based on Vanadium oxide materials) can overcome some of the technical barriers for terahertz high speed switching, by offering a solution that can change data-storage, data communication and telecommunication technologies.

Figure 1B:
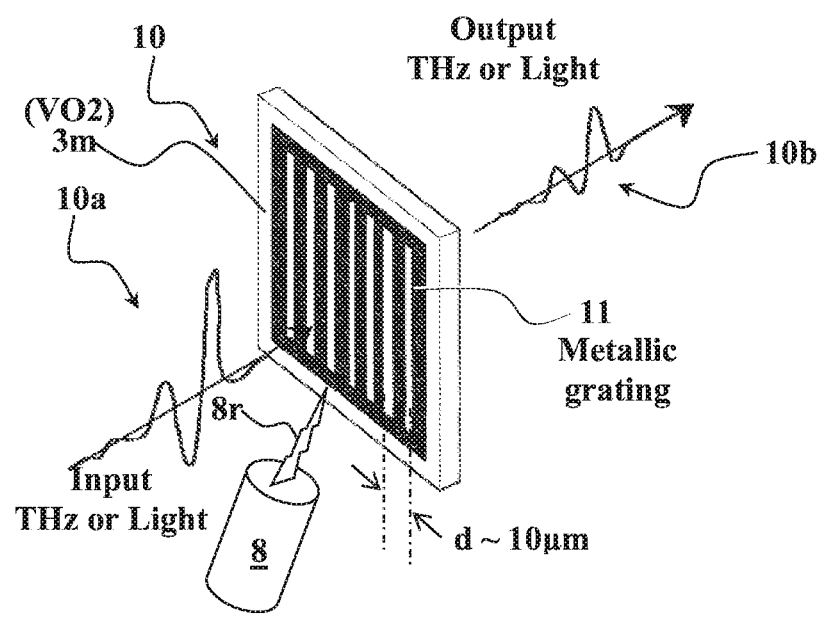

FIG. 1B schematically illustrates structure and operation of an optical switch 10 according to some possible embodiments. In this non-limiting example a thin layer of the metamaterial 3m is deposited on a thin substrate (not shown), and at least partially covered by the gold nanomesh (not shown) configured to be irradiated by signals generated by the signal source 8. The optical switch 10 comprises in some embodiments optical gratings 11 formed by parallel metal lines applied over at least some section, or the entire surface, of the metamaterial 3m, to enhance surface nonlinear processes (e.g., for frequency conversion). The gratings 11 can be made by mechanical or chemical erosion.

The distance d between the metal gratings 11 can be configured for phase matching input radiation 10a of different wavelengths to provide a responsive phase matched and coherent output radiation 10b. This distance d is typically set to be substantially smaller than the wavelength of the input radiation 10a (e.g., RF, microwave, or Terahertz) e.g., in some embodiments d is about 10 micrometers, to thereby guarantee that all input wavelengths of the input radiation 10a pass through the optical switch 10 to yield a coherent and phase matched output radiation 10b.

Signals 8r (electromagnetic light/RF/microwave radiation or electrons/electric field) from signal source 8 applied to the metamaterial 3m of the optical switch 10 causes release of hot electrons from the gold particles of the nanomesh into the metamaterial layer 3m, causing the metamaterial 3m to change from an opaque phase into a transparent phase, within a time interval smaller than a picosecond. The phase change of the metamaterial layer 3m can be used to modulate the input electromagnetic radiation 10a directed onto one side of the device 10, to produce a phase shifted output 10b of the electromagnetic radiation, at the other side of the device 10.

Figure 1C:
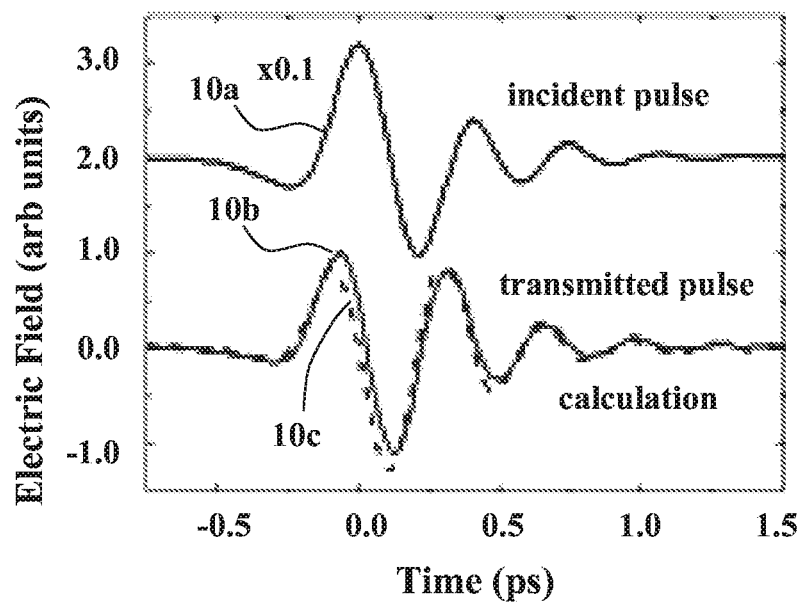

The signal source 8 can be physically connected to the optical switch 10 e.g., using a photomixer or frequency multiplier, or may be implemented by a signal source using a proximity port to apply the input electromagnetic radiation 10a e.g., photomixer or frequency multiplier (i.e., without physically contacting the switch device 10), capable of generating pulse signals near and/or in the Terahertz frequency range e.g., ≥400 Gb/s and up to 40 THz. FIG. 1C graphically illustrates the phase shift obtained between the input electromagnetic radiation 10a and the electromagnetic radiation 10b output from the optical switch 10, closely fits a calculations shown by the dashed-line plot 10c.

Figure 2:
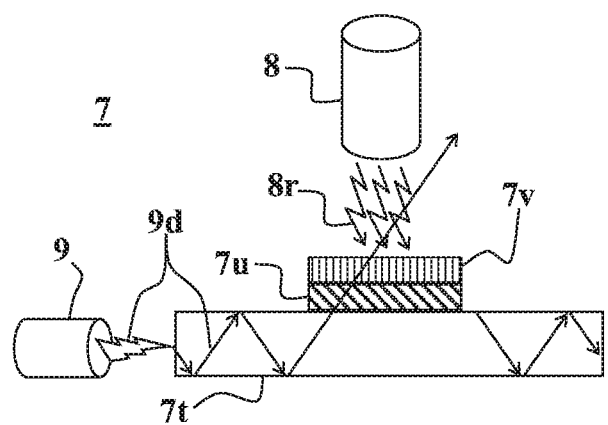
FIG. 2 schematically illustrate an optical switch according to some possible embodiments.

FIG. 2 schematically illustrates an optical switch 7 according to some possible embodiments. The optical switch 7 comprises a wave conducting substrate 7t configured to pass therealong electromagnetic radiation (EMR) 9d generated by the EMR source 9 (e.g., laser light generator), a metamaterial nanoparticles layer 7u optically coupled to at least some portion of the transmissive substrate 7t, and the nanomesh layer 7v applied over at least some portion of the metamaterial layer 7u. The wave conducting substrate 7t can be configured to pass the EMR 9d therethrough along its length by total internal reflection (TIR) e.g., using suitable optically transmissive material and/or cladding (not shown).

Modulating (EMR light, RF, microwave, Terahertz or electric) signals 8r generated by the signal source 8 and applied to the nanomesh layer 7v are used to switch the metamaterial layer 7u between its optically opaque and transparent phases, and correspondingly affect the internal reflection properties of the wave conducting substrate 7t between optically reflecting and non-reflecting (or partially reflecting), states, thereby modulating input EMR 9d according applied modulating signals 8r.

In some embodiments electromagnetic radiation sources, and/or the modulating signal sources 8, utilize techniques and/or implementations described and illustrated in international publication No. WO 2007/132459, and/or U.S. Pat. No. 9,964,442, of the same applicant hereof, the disclosure of which is incorporated herein by reference. The modulated EMR produced by the devices disclosed herein can be detected by state of the art detectors, such as but not limited to, passive or active detectors.

In some embodiments metamaterials configured to controllably cause negative refraction are used for modulating electromagnetic radiation. For example, in possible embodiments the metamaterial is optically coupled to some portion of a transmissive core of an optical fiber, or of an optical resonator, whereby the phase of the light passing therethrough is shifted by application of the modulating signals (8r) to the gold nanomesh applied over at least some portion of the metamaterial. Objectives of such optical switches/modulators include high modulation efficiency, low power modulating signal (8r) e.g., voltage, low insertion loss, high ON/OFF rate, large modulation with "elastic" wavelength, negligible or controllable frequency chirp, and long lifetime.

Figure 3:
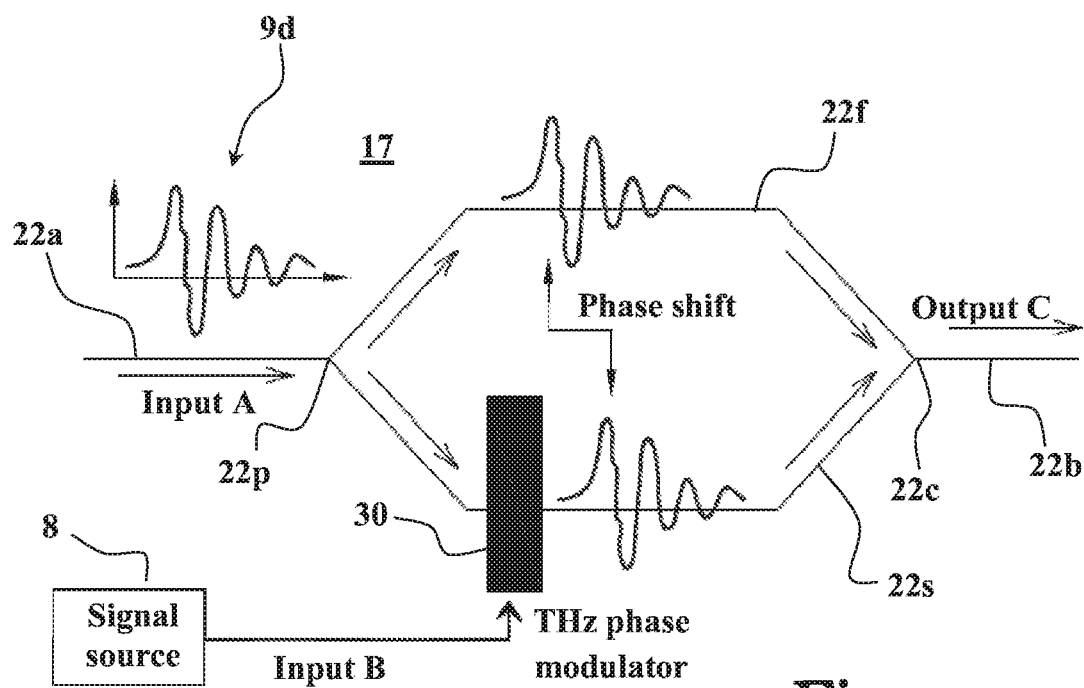
FIG. 3 schematically illustrate possible implementation of optical modulator according to some possible embodiments.

FIG. 3 schematically illustrates an optical modulation device 17 according to some possible embodiments. The modulation device 17 comprises an input wave line 22a configured to introduce input EMR 9d (Input A) into the modulator 17, an optical splitter 22p configured to split the input EMR 9d into first and second wave lines, 22f and 22s respectively, an optical modulator 30 optically coupled to the second wave line 22s, and an optical combiner 22c configured to combine the EMR traveling along the first and second wave lines, 22f and 22s, into an output wave line 22b (Output C). The optical modulator 30 is configured to controllably alter the EMR passing through the second wave line 22s responsive to modulating signals (Input b) received from the signal source 8, and responsively introduce phase shifts thereto. In this way the EMRs from the first and second wave lines are combined either constructively or destructively by the optical combiner 22c, responsive to the modulating signals from the signal source 8, thereby optically modulating the input EMR 9d. The optical modulator 30 can be implemented utilizing any of the optical switches/modulators described hereinabove and hereinbelow.

Figure 4A:
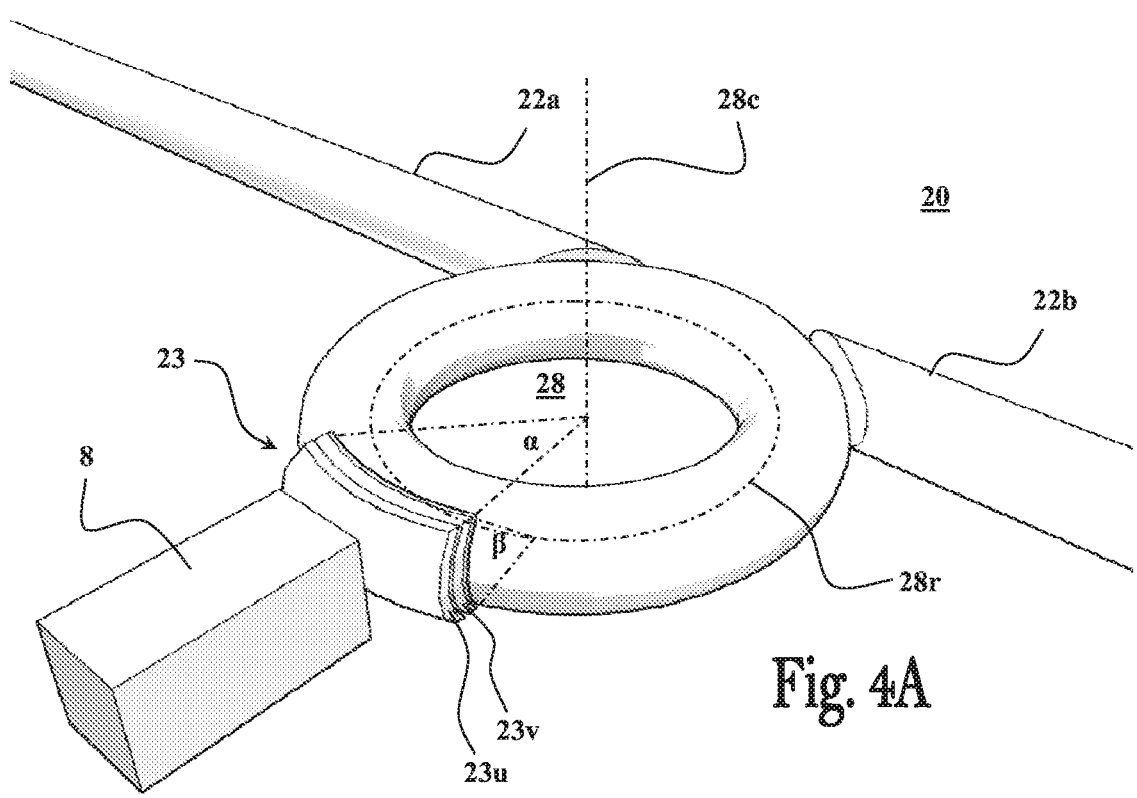

FIG. 4A schematically illustrates an optical modulator 20 utilizing a ring WGM resonator 28. The ring resonator 28 is optically coupled to an input wave line 22a, configured to introduce into the resonator 28 the input EMR, and to an output wave line 22b, configured to receive from the resonator 28 the output EMR modulated by the resonator 28. The ring resonator 28 comprises a metamaterial assembly 23 optically coupled to at least some section of its optically transmissive core. The metamaterial assembly 23 can be coupled to defined angular/arc sections defined about the central/symmetry axis of the resonator 28c (define by the angle α), and/or about its circular axis 28r (define by the angle β). Optionally, the metamaterial assembly 23 is optically coupled to the entire transversal circumference of the ring resonator 28 (α=360°). Optionally, the metamaterial assembly 23 is optically coupled to the entire sectional circumference of the ring resonator 28 (β=360°).

The metamaterial assembly 23 comprises a layer of metamaterial (e.g., VO2) nanoparticles 23v, applied on at least some portion of (or all over) a wall section of the core material of the ring resonator 28, and the gold nanomesh 23u applied over at least some portion of the metamaterial nanoparticles layer 23v. The nanomesh 23u is configured to receive modulating (electromagnetic and/or electric) signals from the signal source 8, and responsively change the metamaterial nanoparticles layer 23v between its optically transmissive and optically non-transmissive states for modulating the EMR introduced thereinto by the input wave line 22a.

Figure 4B:
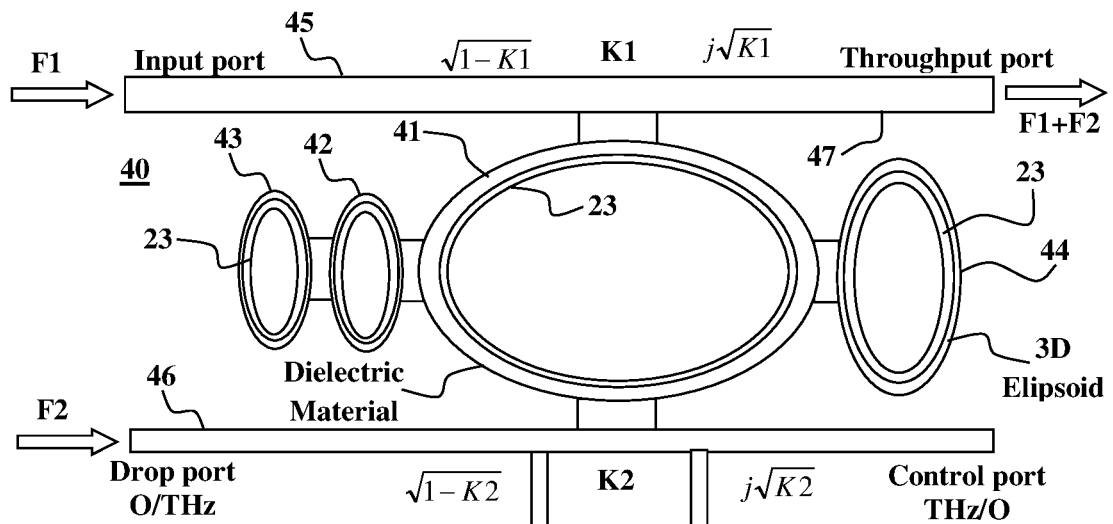

FIG. 4B schematically illustrates an optical modulator device 40 utilizing a plurality of optically coupled WGM resonators 41, 42, 43 and 44, configured to bridge the wavelength gap between two input EMR data carriers, F1 and F2, of different frequencies (e.g., light and/or Terahertz signals). The modulator 40 comprises respective input wave lines, 45 and 46, configured to introduce the EMR carriers, F1 and F2 respectively, into the main/modulation WGM resonator 41, for example, by proximity i.e., optical coupling without physically contacting the WGM resonator 41. The WGM resonator 41 is made in some embodiments from a dielectric material which inner wall is covered by a metamaterial assembly 23 i.e., comprising a layer of metamaterial nanoparticles (e.g., VO2) covered by an electrically conducting nanomesh (e.g., made of gold).

The main WGM resonator 41 is configured to trap the modulated EMR carriers F1 and F2 propagating along the input lines 45 and 46, couple their frequencies one to the other as they resonate along the inner wall of the WGM resonator 41 covered by the metamaterial assembly 23, and output EMR radiation through the output line 47 optically coupled to the main WGM resonator 41. The output EMR propagating along the output wave line 47 thus combines the modulated EMR carriers to provide the output EMR F1+F2. This is achieved in some embodiments by gratings configured to facilitate non-linear processes that yield EMR merging effect by random surface charge and possible equilibrium local states on the surface. In this way crosstalk/combining between EMR of substantially different wavelengths is facilitated (e.g., RF and Terahertz). Gratings (e.g., metallic gratings—not shown) can be applied over the metamaterial assembly, as demonstrated in FIG. 1B.

The auxiliary WGM resonators, 42, 43 and 44, can be made from a dielectric material which internal wall is covered by the metamaterial assembly 23. The auxiliary WGM resonators, 42, 43 and 44, are optically coupled to the main WGM resonator (by proximity), but their geometrical dimensions are configured to shape the combined EMR trapped inside the main/modulation WGM resonators 41 in predefined fashion to introduce radiation patterns to be used for demodulating the combined signal at a receiver (not shown) that receives the output EMR propagating along the output wave line 47, for example, by adding (none information) patterns to the spectral variations of the carrier and the modulated information it serves to prevent mistakes in the communication.

In this way multiple EMR carriers having different frequencies (e.g., RF, microwave, and/or Terahertz) can be optically combined onto a single EMR carrier, and transmitted towards the receiver. Though the WGM resonators 41, 42, 43 and 44, shown in this non-limiting example are ellipsoids, other configurations and shapes can be similarly used. The dimensions of the main ellipsoid WGM resonator 41 can generally be about 10-150 micron, and the dimensions of the auxiliary ellipsoid WGM resonator, 42, 43 and 44, can generally be smaller than the main/modulation ellipsoid 41 to prevent modulation.

Figure 5A:
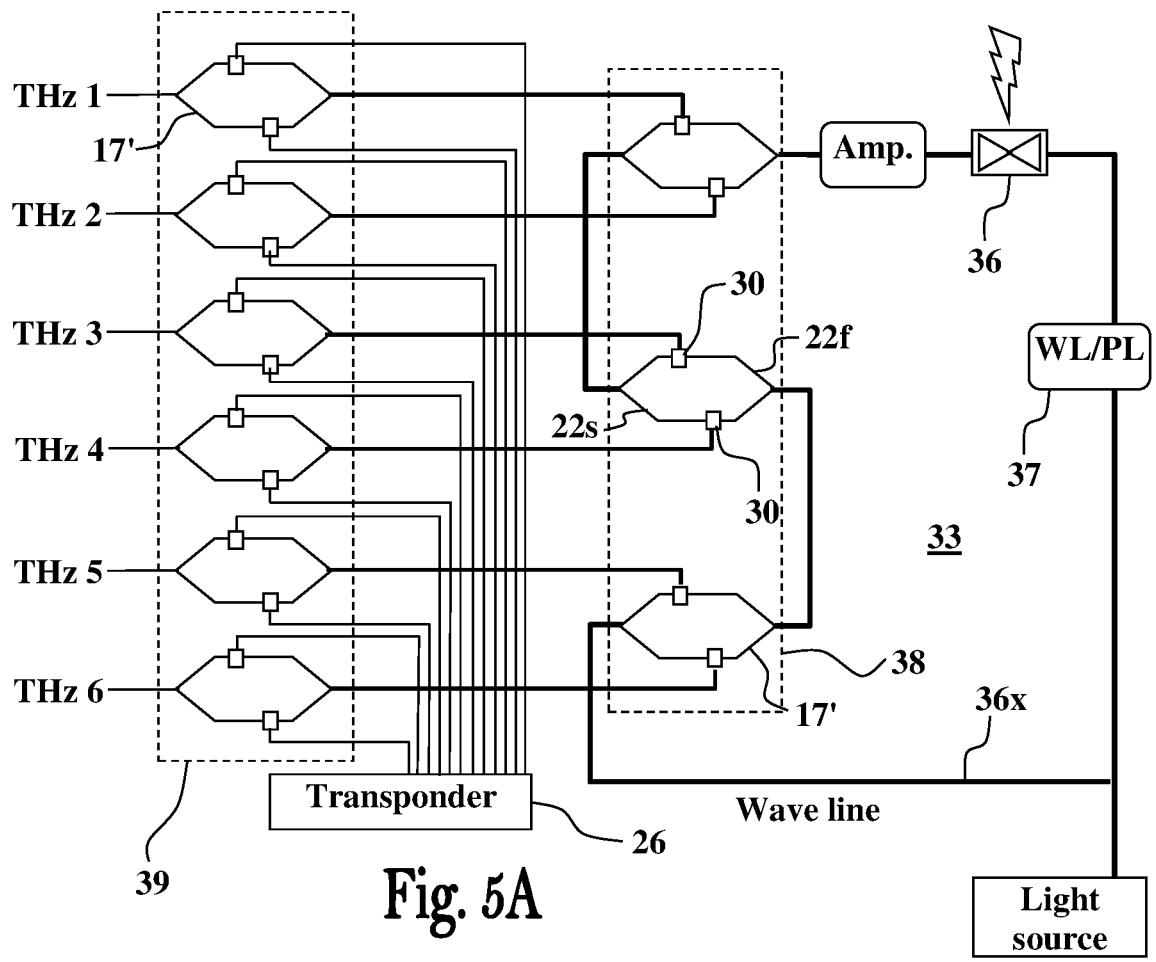
FIGS. 5A to 5C exemplify data communication systems utilizing the WGM resonators based optical wave modulators to combine data carriers of different frequencies.

FIG. 5A schematically illustrates an optical data communication system 33 utilizing an optical modulator 17' configured to receive two modulating signals and combine them onto an EMR carrier, in this specific and non-limiting example a terahertz carrier, THz1, THz2, . . . . The optical modulator 17' can be implemented by an arrangement of the optical modulator device (17) shown in FIG. 3A, or by an implementation of the WGM resonator based modulators of FIGS. 4A and/or 4B, modified for optically modulating a plurality EMR waves having different wavelengths, THz1, THz2, . . . .

The modified optical modulator device 17' in this example comprises an optical modulation unit 30 in each of the wave lines 22f and 22s, for optically modulating the EMR introduce into each optical modulator device 17' by two respective modulating signals, to perform branch modulation, such that each branch is implements a separate data channel by its respective optical modulation unit 30. The system 33 comprises a first set 39 of optical modulator devices 17', each configured to receive and modulate by phase shifting a respective EMR carrier, THz1, THz2, . . . , with two modulating signals from the transponder 26. The transponder 26 is configured to generate two modulating signals for each optical modulator device 17' in the first set of optical modulator device 39.

A second set of optical modulator devices 38 is configured to modulate EMR from the light source (e.g., laser source) passing through the wave line 36x. Each optical modulator device 17' in the second set of optical modulator devices 38 is configured to receive two respective modulated optical signals produced by optical modulator device 17' of the first set of optical modulator device 39 for modulating the EMR in the wave line 36x. The modulated EMR generated by the second set of optical modulator devices 38 (also referred to as complex signal) can be emitted by antenna transmitter unit 36, configured to emit out the complex signal over air interface. The tuning unit 37 is optionally used for efficient Shannon correlation to adapt the modulated signals to the bandwidth of the EMR carrier.

Figure 5B:
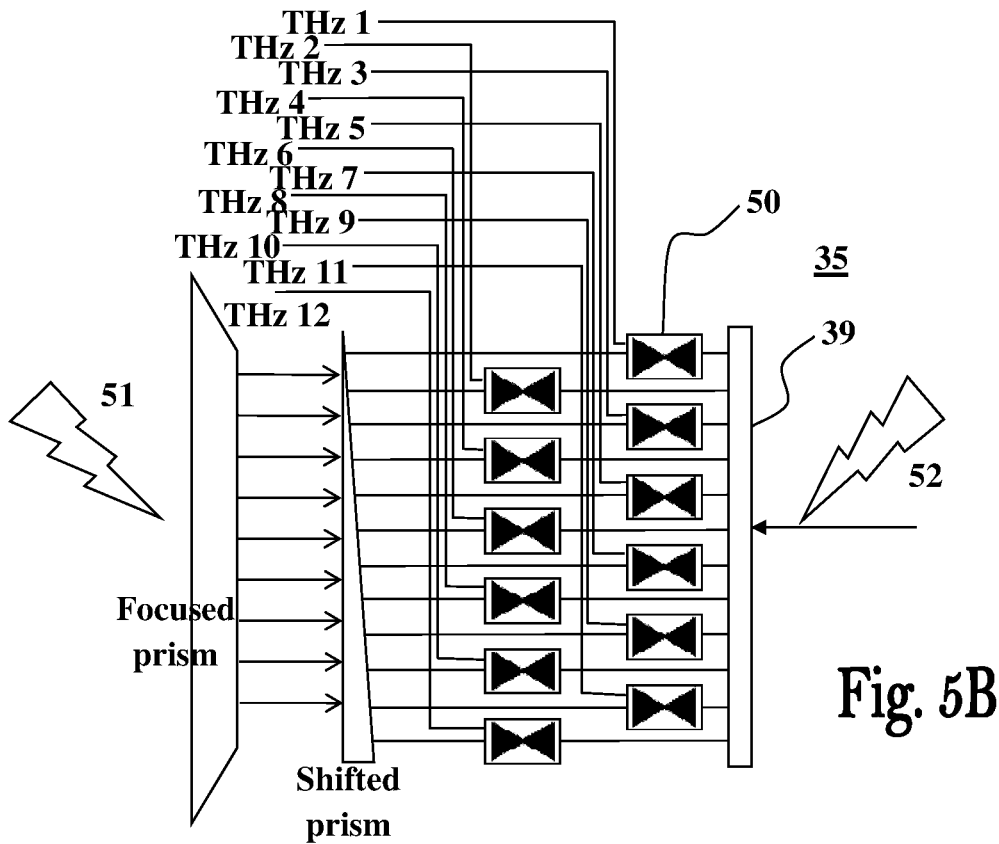

FIG. 5B schematically illustrate an optical data communication system 35 comprising a plurality of optical modulators chip units 50 configured for mixing two THz signal of different frequencies, each configured to receive a respective specific band of the input EMR 51 (e.g., from a light/laser source) directed by the focused prism and split by the shifted prism for creation of multiple channels, and input EMR 52 (e.g., from a light/laser source) from combiner unit 39 for signal integration, and modulate the same onto a respective Terahertz wave THz1, THz2, . . . . The optical modulators chip units 50 can be implemented by WGM resonators 40 shown in FIG. 4B configured to couple EMR from two EMR data carriers and generate a respective Terahertz output EMR combining the two data carriers, as explained hereinabove.

Figure 5C:
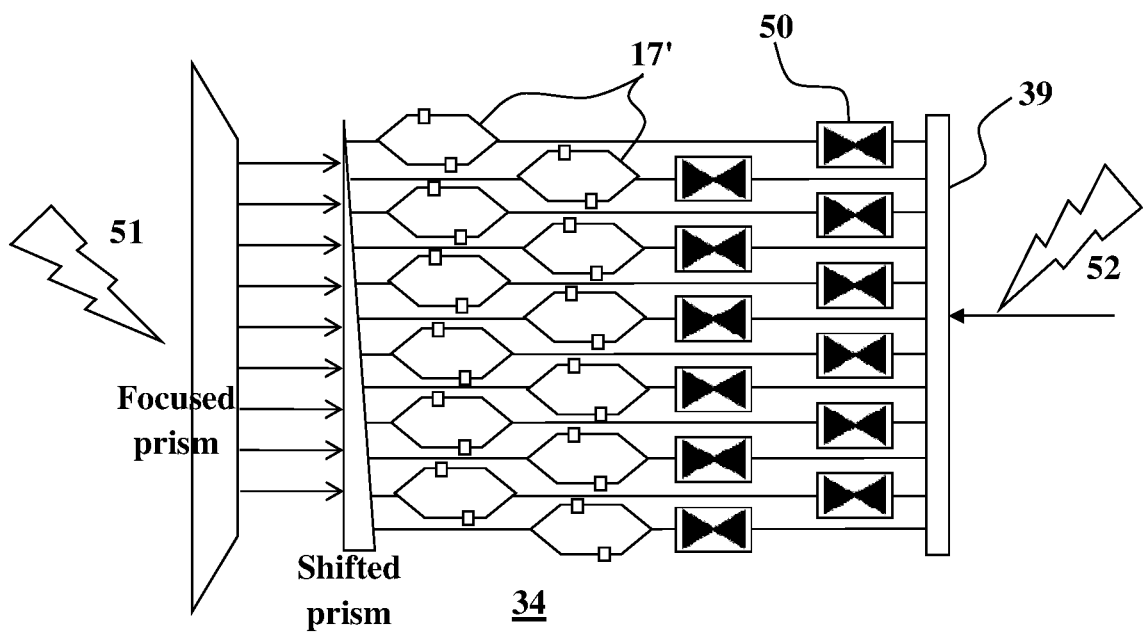

FIG. 5C schematically illustrates yet another optical data communication system 34, wherein a respective optical modulator device 17' is optically coupled to each optical modulator chip unit 50 of the system 35 shown in FIG. 5B. In this non-limiting example the optical modulator device 17' are utilized to combine RF signals onto the input EMR 51, which is then combined by the respective optical modulator chip unit 50 with the EMR input carrier 52 from the combiner 39, to generate a respective THz channel.

As demonstrated hereinabove and hereinbelow, the optical modulation/switch devices of the present application introduce modulation technologies that can operate according to the physical nature of their signal, and the embodiments of the optical modulators/switches can be employed to facilitate crosstalk/combining between wavelengths so broadly separated i.e., in the RF and Terahertz bands.

Optical RF and/or THz are just one category that includes a wide array of novel devices. In some embodiments whispering gallery mode (WGM) optical and THz resonators are utilized to modulate the input EMR. Understanding how these devices are fabricated and used is important for appreciating their performance and limitations. This part of the description will, therefore, introduce this class of resonator sensors (transmitter and receivers) and describe how these devices can be used for THz communication of data in general, and for data centers in particular as a viable solution for a fast communication.

WGM optical resonators exhibit tunability and narrow resonance linewidths, and attain extraordinary optical properties intensities that originally led to their use in some embodiments for telecommunications as modulator apparatus. They have since evolved into valuable tools for probing nonlinear optical phenomena and quantum eletrodynamical principles. In some possible embodiments WGM optical resonators are utilized to implement optical communication modulators, as will described below. These embodiments can be used for, but not limited to, communication biochemical assays, biomedical assays, chemical and molecular biology assays, as their extreme sensitivity in these arenas can be exploited to develop analytical and diagnostic instrumentation.

WGM resonators derive their name from the path that the resonant light takes as it circulates in the cavity. This path is similar to the one that sound waves took along the curved wall of a circular room studied by Lord Rayleigh. In these whispering galleries, two people standing facing the wall at opposite sides of the room can hear each other even at a whisper. These people would not be able to hear each other if either stepped backward toward the center of the room. This effect is caused by the smooth, curved walls guiding the sound waves around the periphery of the room with great efficiency. Sound waves taking any other path to the listener are dissipated or scattered along route.

WGM optical resonators are dielectric structures capable of trapping light in paths around the periphery similar to those taken by sound waves traveling from one person to another in a whispering gallery. Though Mie and Debye described the resonant eigen-frequencies of dielectric spheres before Lord Rayleigh's work, the name was not applied to this type of optical resonator until much later.

Embodiments of the optical switches/modulators disclosed herein can be utilized in data centers to provide the scalability and adaptive networking required for modern data network e.g., applications and data repositories managed in a cloud. A commonly used metric to determine the energy efficiency of a data center is power usage effectiveness, or PUE. This simple ratio is the total power entering the data center divided by the power used by the IT equipment.

$$PUE = \frac{Total\_Facility\_Power}{IT\_Equipment\_Power}$$

Total facility power consists of power used by IT equipment plus any overhead power consumed by anything that is not considered a computing or data communication device (i.e., cooling, lighting, etc.). An ideal PUE value is 1.0 for the hypothetical situation of zero overhead power. The average data center in the US has a PUE of 2.0, meaning that the facility uses two watts of total power (overhead+IT equipment) for every watt delivered to IT equipment. State-of-the-art data center energy efficiency is estimated to be roughly 1.2. Some large data center operators like Microsoft and Yahoo! have published projections of PUE for facilities in development; Google publishes quarterly actual efficiency performance from data centers in operation.

Energy Efficiency is a key features for some of the embodiments disclose herein. The U.S. Environmental Protection Agency has an Energy Star rating for standalone or large data centers. To qualify for the ecolabel, a data center must be within the top quartile of energy efficiency of all reported facilities. European Union also has a similar initiative known as the EU Code of Conduct for Data Centers.

Often, the first step toward curbing energy use in a data center is to understand how energy is being used in the data center. Multiple types of analysis exist to measure data center energy use. Aspects measured include not just energy used by IT equipment itself, but also by the data center facility equipment, such as chillers and fans.

Power is the largest recurring cost to the user of a data center. A power and cooling analysis, also referred to as a thermal assessment, measures the relative temperatures in specific areas as well as the capacity of the cooling systems to handle specific ambient temperatures. A power and cooling analysis can help to identify hot spots, over-cooled areas that can handle greater power use density, the breakpoint of equipment loading, the effectiveness of a raised-floor strategy, and optimal equipment positioning (such as AC units) to balance temperatures across the data center. Power cooling density is a measure of how much square footage the center can cool at maximum capacity.

An energy efficiency analysis measures the energy use of data center IT and facilities equipment. A typical energy efficiency analysis measures factors such as a data center's power use effectiveness (PUE) against industry standards, identifies mechanical and electrical sources of inefficiency, and identifies air-management metrics.

In order to explore the opportunities of the optical switches/modulators disclosed herein for THz data rates data communication, data communication systems as disclosed herein can be devised utilizing multi-hop communication, wherein the nodes within the network able to communicate with the help of two or more other nodes, which are acting as the relay nodes between the source and destination node THz communication with both passive and active relays. The benefits of using intermediate relays between a transmitter and a receiver at THz Band frequencies are several. As in any wireless communication system, the transmission power, and thus the energy consumption, can be reduced, by having several intermediate hops between the transmitter and the receiver. In addition, due to the unique distance-dependent behavior of the available bandwidth, the reduction of the transmission distance results into the availability of much wider bands, and, thus, the transmission at much higher bit-rates. These can contribute, once again, to major energy savings.

As indicated hereinabove the embodiments disclosed herein can be used to develop new types of fast optical conductors configured to operate based on charge coupling versus regular conductivity.

Emerging wearable nano sensor networks enable a set of valuable applications in biomedical and environmental fields. At the same time, the current state of communication technologies significantly limits the processing capabilities of Prospective nanomachines. Consequently, implying that all the analysis of collected data needs to be performed on a macro device. Therefore, to effectively enable long-awaited applications of nanonetworks their seamless integration into existing networking infrastructures is required, leading to the concept of Internet of Nano Things. In embodiments of this application, the interoperability between already deployed macro networks and emerging nano networks is pre mature preliminary investigated.

Yet, the solution for this problem is nontrivial, as the existing macro wireless networks use primarily the carrier-based electromagnetic communications, while nanomachines must rely on ultra-low-power pulse-based EM radiation or inherently mobile objects as information carriers. Thus, the direct interaction between macro and nano networks is currently not feasible, forcing using special gateway nodes. Moreover, the modern solutions for nano communications have to be rapidly improved to enable construction of large-scale networks on top of existing link level techniques. Numerous theoretical questions are to be addressed to achieve this goal, ranging from the design of a proper modulation and coding technique to mitigation of noise and interference effects. Embodiments disclosed herein present gateway for this field as well.

It is noted that the combining metamaterial based switches/modulators (e.g., using VO2 particles for transiting between opaque and transparent states of the metamaterial with PS time range) with WGM resonators (e.g., PANDA resonance ring) can provide fast optical data communication implementations, and tailor antennas for spectrum of applications in the fields of biology, chemistry, material science, Nano network etc.'.

As described hereinabove and shown in the associated figures, the present application provides optical switches and modulators for Terahertz data communication rates, and methods for fabricating the same. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. An optical switch device usable for Terahertz data communication rates, the device comprising:
an optically transmissive substrate configured for propagating electromagnetic radiation therethrough; and
a metamaterial arrangement optically coupled to said substrate, said metamaterial arrangement comprising at least one layer of metamaterial particles optically coupled to at least some portion of said optically transmissive substrate, and at least one nanomesh layer made of at least one electrically conducting material placed over at least some portion of said at least one metamaterial layer, said at least one nanomesh layer being configured to discharge electrons into said at least one metamaterial layer responsive to electromagnetic or electric signals applied to the metamaterial arrangement, and said at least one metamaterial layer being configured to change from an optically opaque state into an optically transparent state upon receiving the discharged electrons, to thereby at least partially alter electromagnetic radiation passing through the substrate;
wherein said optically transmissive substrate is at least some portion of an optical whispering gallery mode (WGM) resonator, and said metamaterial arrangement is configured as a coat over an internal wall section of the resonator disposed within a core material of the resonator.

2. The device of claim 1, wherein the WGM resonator is a type of PANDA resonator.

3. The device of claim 1, wherein the optically transmissive substrate is a thin film.

4. The device of claim 3, wherein the substrate has a thickness of about 0.1 to 1 nanometers.

5. The device of claim 1, wherein the at least one metamaterial layer comprises Vanadium oxide.

6. The device of claim 5, wherein the at least one metamaterial layer is configured to exhibit negative refraction upon receiving the discharged electrons.

7. The device of claim 1, comprising metal gratings formed on the metamaterial arrangement.

8. The device of claim 4, wherein a thickness of the at least one layer of metamaterial particles is about 0.1-1 nanometer.

9. The device of claim 8, wherein particle size of the at least one layer of metamaterial particles is about 1 to 100 nanometers.

10. The device of claim 1, wherein the at least one nanomesh layer comprises gold.

11. The device of claim 10, wherein at least one of the following is being held true (a) a thickness of the at least one nanomesh layer is about 0.1 to 1 nanometers; (b) particle sizes of the at 10 least one nanomesh layer is about 20 to 100 nanometers; (c) a pore dimension of the at least one nanomesh layer is about 0.1 to 1 nanometers; and any combination thereof.

12. The device of claim 1, wherein at least one of the following is being held true (a) having a geometrical dimension of about 100 to 500 nanometers; (b) the electromagnetic or electric signals applied to the metamaterial arrangement are in the RF, microwave, or Terahertz frequency bands; (c) the electromagnetic or electric signals applied to the metamaterial arrangement are in a range of 100 MHz to 40 THz; and any combination thereof.

13. An optical modulator usable for Terahertz data communication rates, the modulator comprising the optical switch device of claim 1, an input wave line configured to introduce input electromagnetic radiation into said optical switch device, and an output wave line configured to transfer output electromagnetic radiation at least partially altered by said optical switch device.

14. A system comprising an optical combiner for combining two or more electromagnetic data carriers, said optical combiner comprising: the optical switch device of claim 1, and at least two input wave lines optically coupled to the WGM resonator for introducing respective at least two electromagnetic data carriers thereinto, and at least one output wave line optically coupled to the WGM resonator for outputting electromagnetic radiation trapped inside said WGM resonator and at least partially merging said at least two electromagnetic data carriers.

* * * * *